United States Patent
Chou et al.

[11] Patent Number: 5,888,920
[45] Date of Patent: Mar. 30, 1999

[54] INTEGRATED PROCESS USING IN SITU REGENERATED SULFURIC ACID AS CATALYST

[76] Inventors: Tse-Chuan Chou; Chao-Shan Chou; Yi-Lin Chen, all of 22, Lane 252, Tong Ping Road, Tainan, Taiwan

[21] Appl. No.: 784,008

[22] Filed: Jan. 15, 1997

[51] Int. Cl.⁶ .............. B01J 20/34; B01J 38/56; B01J 38/60; C01B 17/74
[52] U.S. Cl. .............. 502/22; 502/27; 502/29; 502/31; 502/32; 585/730; 585/731; 208/13; 208/266
[58] Field of Search ............... 502/22, 27, 29, 502/31, 32; 423/DIG. 2, 525, 526, 527, 531; 585/730, 731; 208/13, 266

[56] References Cited

U.S. PATENT DOCUMENTS 5,547,655  8/1996  Chou et al. .................. 423/531

Primary Examiner—Michael Lewis
Assistant Examiner—Alexander G. Ghyka
Attorney, Agent, or Firm—Bacon & Thomas, PLLC

[57] ABSTRACT

This invention discloses an integrated process of alkylation of olefins and regeneration of spent sulfuric acid. The alkylation of olefins may be replaced by nitration of toluene or by chlor-alkali process. The sulfuric acid is used as a catalyst or a absorbent, and the spent sulfuric acid is regenerated in situ and is recycled in the alkylation of olefins, nitration of toluene or chlor-alkali processes.

4 Claims, 1 Drawing Sheet

INTEGRATED PROCESS USING IN SITU REGENERATED SULFURIC ACID AS CATALYST

TECHNICAL FIELD

This invention relates to a method for integrated process using in situ regenerated sulfuric acid as catalyst, i.e. integrated the process unit and the regeneration unit. For example, alkylation of isoparaffin and olefins using in situ regenerated sulfuric acid as catalyst, i.e. the alkylation unit and regeneration unit is integrated.

A high strength of sulfuric acid can be easily and economically maintained in the reactor of a process by recycling the in situ regenerated sulfuric acid from the regenerator to the process reactor. A high efficiency or high yield is obtained in this integrated process. The spent sulfuric acid is not produced in this process i.e. the regeneration is done in a refinery.

BACKGROUND OF THE INVENTION

In a commercial alkylation plant, for example, acid is used as catalyst to produce gasoline by the alkylation of $C_3$–$C_5$ olefins and alkanes. The catalytic acids include sulfuric acid, hydrogen fluoride, and solid acid. Only sulfuric acid and hydrogen fluoride are commercialized nowadays. Because hydrogen fluoride is very toxic, hydrogen fluoride is gradually being phased out in the alkylation process. The most popular catalyst used to manufacture gasoline from the alkylation of $C_3$–$C_5$ olefins and alkanes is concentrated sulfuric acid. The ratio of sulfuric acid to organic compounds in the alkylation reaction vessel is 0.1~0.3, so the amount of concentrated sulfuric acid required in the alkylation process is very large. In general, producing one ton of gasoline makes 0.1 ton spent sulfuric acid. If ten thousands barrels of gasoline are produced a day, one hundred tons of spent sulfuric acid are produced. Such a large amount of spent sulfuric acid can not be cast away or stored, it must be treated in advance. Based on the above description, the key point of alkylation is the treatment or regeneration of the spent sulfuric acid in refinery site and in situ reuse in the alkylation unit, i.e. an integrated process of the combination of alkylation and regeneration.

A lot of products of alkylation processes using sulfuric acid as catalyst were raised by L. F. Albright and A. R. Goldsby, "Industrial and Laboratory alkylations" in ACS symposium series 55, p.91, Washington, D.C., 1977, as shown in Table 1.

TABLE 1

Composition of alkylates obtained over $H_2SO_4$

| hydrocarbons | composition ratio |
| --- | --- |
| isopentane | — |
| n-pentane | — |
| $C_5$ | 8.9 |
| 2,3-dimethylbutane | 4.7 |
| 2-methylpentane | 1.1 |
| 3-methylpentane | 0.4 |
| $C_6$ | 6.2 |
| 2,2,3-trimethylbutane | 0.2 |
| 2,2-dimethylpentane | 0.2 |
| 2,4-dimethylpentane | total |
| 2-methylhexane | 3.4 |
| 3-methylhexane | 0.3 |
| 2,3-dimethylpentane | 2.3 |
| $C_7$ | 6.4 |

TABLE 1-continued

Composition of alkylates obtained over $H_2SO_4$

| hydrocarbons | composition ratio |
| --- | --- |
| 2,2,4-trimethylpentane | 24.3 |
| 2,2,3-trimethylpentane | 1.2 |
| 2,3,3-trimethylpentane | 12.3 |
| 2,3,4-trimethylpentane | 13.0 |
| 2,2-dimethylpentane | 0.2 |
| 2,3-dimethylpentane | total |
| 2,4-dimethylpentane | 3.0 |
| 2,5-dimethylpentane | 6.6 |
| 3,4-dimethylpentane | 0.4 |
| $C_8$ | 61.0 |
| $c_9$ and higher | 17.5 |

The organic products may reside in the sulfuric acid to form said organic impurities, and the water contained in the raw material of alkylation or generated during alkylation may accumulate in the sulfuric acid, so the spent sulfuric acid must be regenerated to remove both the organic impurities and the water.

In order to treat the spent sulfuric acid in a commercial alkylation plant, a sulfuric acid plant is usually set up. The procedure of the treatment of sulfuric acid is described as following. First of all, spent sulfuric acid, air, and fuel are sent into the combustion chamber to burn out the organic impurities and sulfuric acid into $SO_2$, $SO_3$, $CO_2$, $H_2O$ and ashes, etc. After drying the gases from the combustion chamber, the dried gases are purified to remove impurities and ashes in order to get pure $SO_2$. The $SO_2$ gas reacts with air or oxygen to convert to $SO_3$ at high temperature using $V_2O_5$, etc. as catalyst. The $SO_3$ gas is absorbed twice by water to get concentrated sulfuric acid. The operation of producing sulfuric acid in commercial process is very difficult and the costs of both equipment and operation are very expensive, because the complexity of the process, the corrosion of equipment at high temperature, and the presence of different impurities in the spent catalyst.

From the above description, there are some disadvantages using the traditionally commercialized process to treat the spent sulfuric acid: (1) To recover the regenerated sulfuric acid, several stages including in this process; combustion, purification, oxidation, purification again, and absorption have to be carried out on the spent sulfuric acid. The whole process is very complicated. (2) The corrosive compound is treated at very high temperature, so special material has to be chosen to construct the reactor, etc. (3) Based on the descriptions of (1) and (2), the costs of both equipment and operation are very expensive obviously. (4) Very large amounts of waste water, waste gas, and ashes are produced during the recovery process. Additional investment has to be funded to the facilities of retreatment for the waste materials. The additional investment is substantial. So, the traditionally commercialized process for the recovery of sulfuric acid from the spent catalyst of alkylation is very complicated and expensive.

Process for alkylation of alkanes and olefins in the presence of sulfuric acid as catalyst are well known and widely practiced on a commercial scale. Sulfuric acid reacts with hydrocarbons in such alkylation process to form organic impurities or by-products, dialkyl sulfates, acid alkyl sulfates and acid oils. The major portion of such by-products remains in the acid catalyst phase upon separation of an alkylation reaction zone effluent into a hydrocarbon effluent phase and a catalyst phase. In commercial alkylation processes, the hydrocarbon effluent is subjected to traditional distillation column for recovery of unreacted alkanes, olefins and alkylated hydrocarbon product. The unreacted alkanes or olefins are commonly recycled to the alkylation reactor for maintaining the ratio of isoparaffin to olefin above about 2.0. In a typical alkylation process, isoparaffins and olefins in the liquid phase are contacted with concentrated sulfuric acid of approximately 98% strength. The hydrocarbon and acid phases are separated and the acid is reused. The formation of by-products and the accumulation of water make the sulfuric acid be less strength. During repeated use in the processes, the acid becomes spent when the concentration of the acid falls to 85% to 90% concentration, it is necessary to withdraw the spent acid and supply fresh acid to the reaction zone. The spent acid is an approximately standardized material which varies but very little in composition between different alkylation plants. Although its composition is not precisely known, "spent alkylation sulfuric acid" is well-known in the industry by that name and those skilled in the art are well aware of its identity and characteristics as shown in Table 1. The data in Table 1 is a typical example.

Our previous U.S. Pat. No. 5,547,655 disclosed and claimed a method for the regeneration of spent alkylation sulfuric acid which comprises treating the acid in a vessel and removing organic impurities and water simultaneously through the active intermediates generated by heat, photolysis and electrolysis.

The present invention, the alkylation of alkanes and olefins can be carried out by using in situ regenerated spent sulfuric acid. The concentration of sulfuric acid in the alkylation zone can be kept at an almost constant level, such as 93%, 94% or any desired concentration between 90% to 98%, by the recycle regenerated sulfuric acid stream from the spent sulfuric acid regenerator. Based on the economic consideration the spent sulfuric acid concentration in the conventional process is about 90% or below 90% since the spent sulfuric acid is just a waste material and a sulfur resource of a sulfuric acid plant.

Economically, the best operating acid strength of the spent acid to discard is about 90% in a conventional alkylation process. However, both the quality and research octane number of gasoline from alkylation process are better by using a higher concentration sulfuric acid as catalyst raised by L. F. Albright and A. R. Goldsby, "Industrial and Laboratory Alkylations" in ACS symposium series 55, P.272, Washington, D.C., 1977. The combination of alkylation unit and regeneration unit makes this alkylation process be a higher efficiency and better gasoline quality integrated process. The acid regeneration can be done in refinery.

Based on the previous description and our previous invention, both the organic material and water can be removed simultaneously from the spent sulfuric acid in the presence or absence of other species, such as free radical, anion, cation, molecules and any other possible species.

The invention described above can be applied to a system containing sulfuric acid, organic material, water and nitric acid which is generated from a nitration process to produce mono-nitrotoluene (MNT), dinitrotoluene (DNT) and trinitrotoluene (TNT). In this process, concentrated $H_2SO_4$ is a catalyst while nitric acid is one of the reactants. In general, a nitration process to produce TNT contains three stages. The organic compounds and water content in the spent nitrating mixture of $H_2SO_4$ and $HNO_3$ from the different stages are different. However, both the organic compounds as well as water can be removed simultaneously from any type of these three stages. Accordingly, an integrated process of nitration of spent acid can be developed obviously.

The chlor-alkali industry is an important process to produce chlorine gas as well as caustic soda. The chlorine gas from anolyte contains saturated humidity. Dried chlorine gas or liquid is the largest industrial product manufactured by electrolysis. The drying of wet chlorine gas is performed widely by passing the Net chlorine gas through the concentrated $H_2SO_4$ to absorb the water. In general, the fresh sulfuric acid (98% by weight) was charged to the drying tower and the spent sulfuric acid is discarded at about 70% $H_2SO_4$ and 30% $H_2O$. The efficiency of water absorption by a 70% $H_2SO_4$ strength will be low. Furthermore, the spent sulfuric acid, in general, is discarded and treated by neutrulization or combustion process which is polluted and uneconomical. A continuous in situ integrated process for the regeneration of sulfuric acid from a drying tower of chloralkali process and recycling the regenerated sulfuric acid as an absorbant of water to the drying tower which comprises the steps of:

(a) withdrawing from a drying tower a liquid effluent comprising a sulfuric acid and water mixture, and a trace or very small amount of chlorine.

(b) passing said liquid effluent into a regenerator maintained at a mild conditions having a temperature from −20° C. to 250° C. and pressure from one to 20 atms wherein said water reacts with active intermediates generated by electricity such that water decomposes and is removed.

(c) recovering a totally or a substantially water free sulfuric acid from said regenerator and recycling the same to said drying tower.

SUMMARY OF THE INVENTION

It is an object of the present invention to provide an integrated process for producing products from the combination of process unit such as alkylation, nitration and drying and regeneration unit such as spent sulfuric acid.

It is a specific object of this invention by using our previous U.S. Pat. No. 5,547,655 to provide a continuous in situ regeneration of a spent sulfuric acid. The regenerated sulfuric acid is reused in process unit. The process unit and regeneration unit can be operated simultaneously, i.e. the integrated process, and provided in a more facile and economical manner.

The present invention, for example, provides a continuous in situ process for the regeneration of a sulfuric acid catalyst which comprises the steps of:

(1) withdrawing from an alkylation reactor an alkylation effluent comprising an olefinic hydrocarbon—sulfuric acid mixture, gas and liquid hydrocarbons.

(2) introducing said alkylation effluent into a separator or settler wherein said effluent is separated into a gaseous hydrocarbon portion, liquid hydrocarbon portion, and sulfuric acid-olefinic hydrocarbon and water portion;

(3) passing said sulfuric acid-olefinic hydrocarbon and water portion of said effluent to a regenerator maintained at a mild conditions having a temperature from −50° to 250° C. and pressure from one to 20 atms wherein both said organic impurities and water react with active intermediates generated by electricity such that both said organic impurities and water are removed simultaneously;

(4) passing said hydrocarbon portions liquid and gaseous of step(2) to a fractionator;

(5) recovering a totally or a substantially organic impurities and water free sulfuric acid from said regenerator and recycling the same to said alkylation unit.

For example, the properties of the spent sulfuric acid were 92% sulfuric acid, 3.5% water and organic impurities COD 11,000. The spent sulfuric acid was regenerated and the properties of the regenerated sulfuric acid were 99.1% sulfuric acid, 0.9% water and organic impurities COD less than 2,000. The regenerated spent sulfuric acid was used for the alkylation runs. The results indicated that the alkylate products were very good and better or similar to the typical commercial alkylate products.

As will be described herein after in greater detail, the essence of our invention includes an integrated process which combines the alkylation unit and the regeneration of sulfuric acid from alkylation unit by contacting a sulfuric acid-olefinic hydrocarbon mixture with active intermediates generated by applying light or heat or electricity with or without additional compounds at mild treating conditions described in U.S. Pat. No. 5,547,655. Similarly, the present invention also provides an integrated process for nitration. The integrated process is the combination of nitration unit and regenerator which in situ regenerates the spent acid containing sulfuric acid, water and nitric acid. The present invention also provides an integrated process for drying of wet chlorine gas from an chlor-alkali process. The spent acid contains sulfuric acid, water and a small amount of chlorine.

DETAILED DESCRIPTION OF THE PREFERRED EMBODIMENTS

Figure 1:
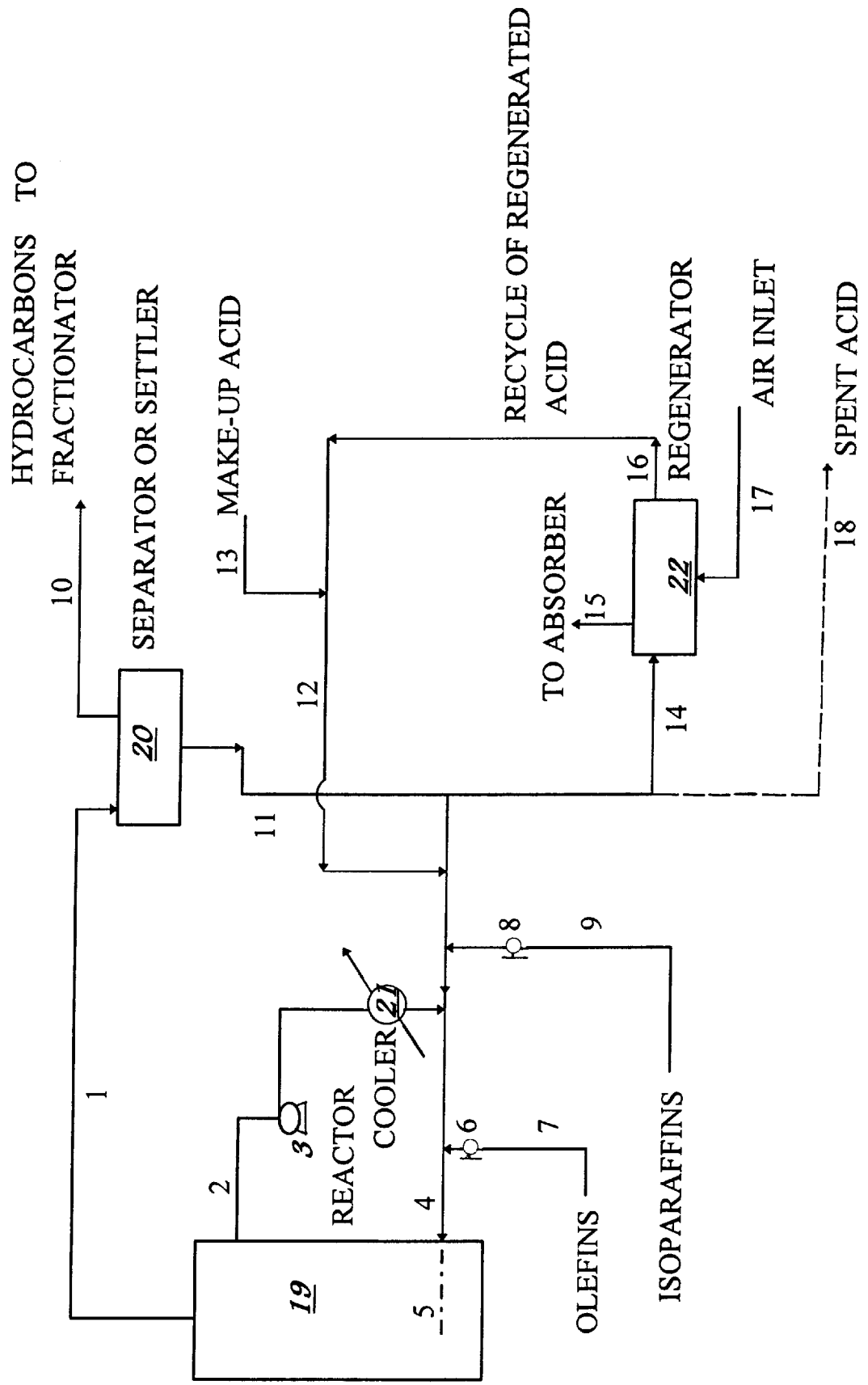
FIG. 1 is a schematic view showing an integrated alkylation process using in situ regenerated sulfuric acid is catalyst.

The drawing of an integrated process including a manufacture process using concentrated sulfuric acid as catalyst or absorbent and a regeneration process of spent sulfuric acid produced from this process is similar for the processes of alkylation, nitration and other process using sulfuric acid as catalyst or absorbent. The alkylation process is a preferred process for the description of the drawing since the spent sulfuric acid from alkylation unit contains the most complicated compounds or impurities.

The olefin and isoparaffin hydrocarbons feed via line 7 and line 9, respectively, into a conventional catalytic alkylation reactor 19 wherein a liquid catalyst such as sulfuric acid is passed via lines 12 and 13. The flow rates of olefins and isoparaffins are controlled by the valves 6 and 8, respectively. Wherein said reactor 2 the liquid catalyst intimately contacts the hydrocarbons through a distributor 5. The temperature of alkylation was controlled by circulation of part of the reactants and products via line 2 by a pump 3 and cooled via cooler 21. At the end of the desired residence time in the alkylation unit, the effluent from the alkylation reactor is withdrawn and passed via line 1 as feed into separator or settler 20.

In separator 20, the effuent from alkylation reactor is separated into a hydrocarbon portion is passed via line 10 and a sulfuric acid olefinic hydrocarbon portion is passed via line 11. The sulfuric acid-olefinic hydrocarbon in line 11 is partially recycled to the alkylation reactor via line 4 if it is necessary and is mainly passed to regenerator via line 14. Sometimes, a purge stream of spent sulfuric acid is passed via line 18.

A air inlet via line 17 is introduced to the regenerator if it is necessary and the air from the regenerator is vented and passed to absorber (not shown). The desired organic impurities and water free regenerated sulfuric acid is recycled to the alkylation reactor via line 16. A make-up sulfuric acid is passed to the alkylation reactor via line 12. The preferred regeneration operation was described in the U.S. Pat. No. 5,547,655.

What is claimed is:

1. A continuous in situ integrated process for regenerating sulfuric acid from an alkylation unit and recycling the regenerated sulfuric acid as a catalyst to the alkylation unit which comprises the steps of:

(a) withdrawing from said alkylation unit an alkylation effluent comprising an aqueous sulfuric acid phase of acid-olefinic hydrocarbon, organic impurities and water, and an organic phase of alkylate, unreacted olefins and alkanes;

(b) separating said alkylation effluent into said aqueous phase and said organic phase;

(c) passing said organic phase to a regenerator maintained at mild conditions having a temperature of from −50° C. to 250° C. and pressure from one to 20 atmospheres (atms) wherein both said organic impurities and water react with active intermediates generated by electricity such that both said organic impurities and water are removed simultaneously;

(d) passing said organic phase from step (b) to a fractionator;

(e) recovering a totally or substantially organic impurities and water free sulfuric acid from said regenerator and recycling the same to said alkylation unit.

2. The process of claim 1 wherein the concentration of sulfuric acid in the alkylation unit is maintained at any concentration between 90 and 98%.

3. A continuous in situ integrated process for the regeneration of sulfuric acid from a drying tower of a chlor-alkali process and recycling the regenerated sulfuric acid as an absorbant or water to the drying tower which comprises the steps of:

(a) withdrawing from said drying tower a liquid effluent comprising a sulfuric acid and water mixture, and a trace or very small amount of chlorine;

(b) passing said liquid effluent into a regenerator maintained at mild conditions having a temperature from −20° C. to 250° C. and pressure from one to 20 atms wherein said water is decomposed by electricity and is removed; and (c) recovering a totally or substantially water free sulfuric acid from said regenerator and recycling the same to said drying tower.

4. The process of claim 3 wherein the concentration of sulfuric acid in the drying tower is maintained at any concentration between 90 and 98%.

* * * * *

UNITED STATES PATENT AND TRADEMARK OFFICE
CERTIFICATE OF CORRECTION

PATENT NO. : 5,888,920
DATED : March 30, 1999
INVENTOR(S) : Chou et al.

It is certified that error appears in the above-indentified patent and that said Letters Patent is hereby corrected as shown below:

Column 6, line 25, delete "organic" and insert - -aqueous- -.

Signed and Sealed this

Twenty-ninth Day of August, 2000

Attest:

Q. TODD DICKINSON

Attesting Officer

Director of Patents and Trademarks